July 23, 1968  L. J. WUBBE  3,393,420
WINDSHIELD WIPER APPARATUS
Filed May 10, 1966  3 Sheets-Sheet 1
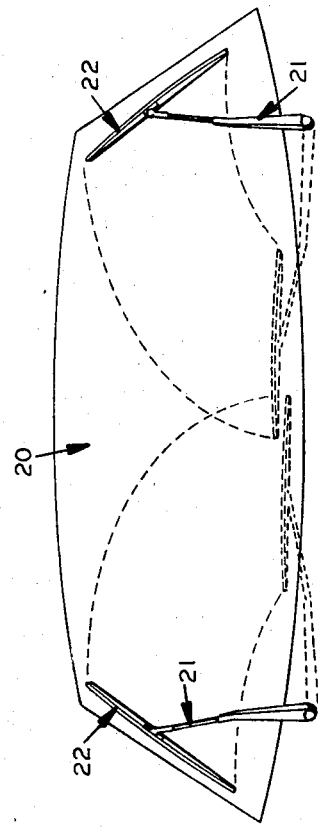
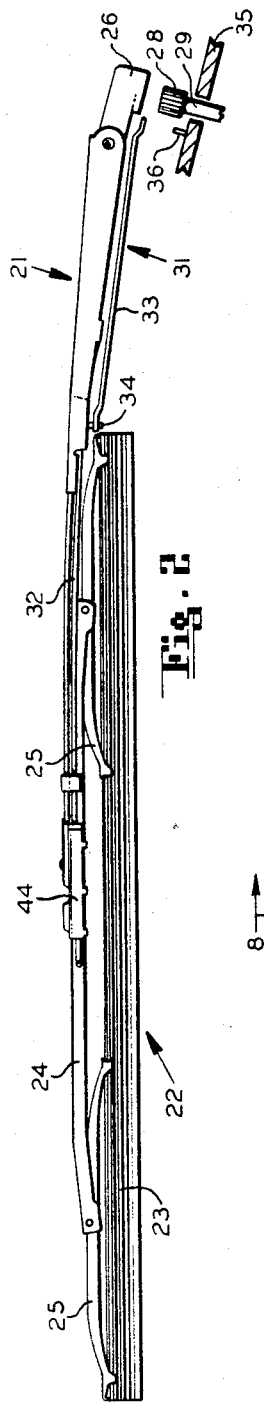
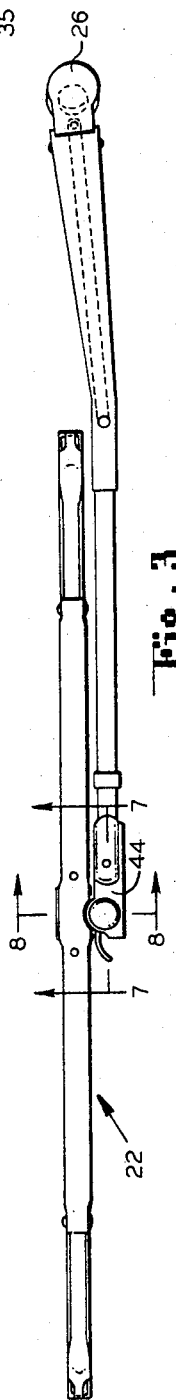
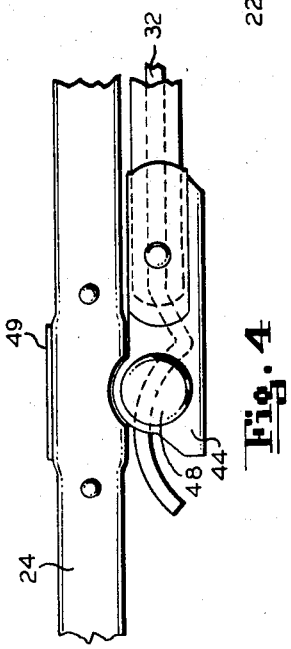
INVENTOR.
LEO J. WUBBE
BY
ATTORNEYS July 23, 1968 L. J. WUBBE 3,393,420
WINDSHIELD WIPER APPARATUS
Filed May 10, 1966 3 Sheets-Sheet 2
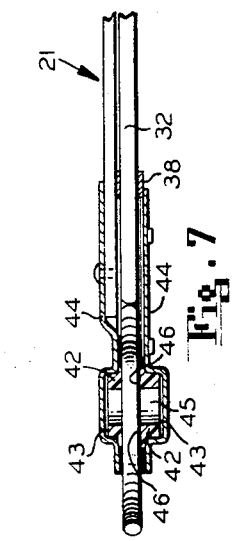
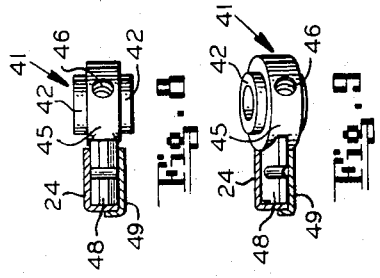
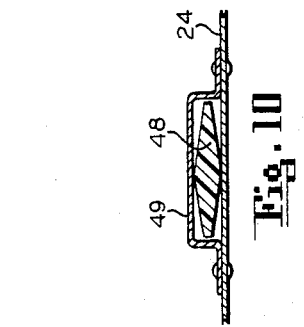
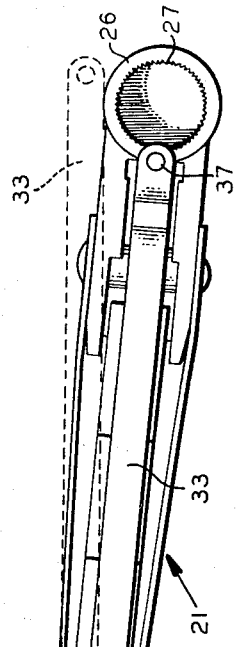
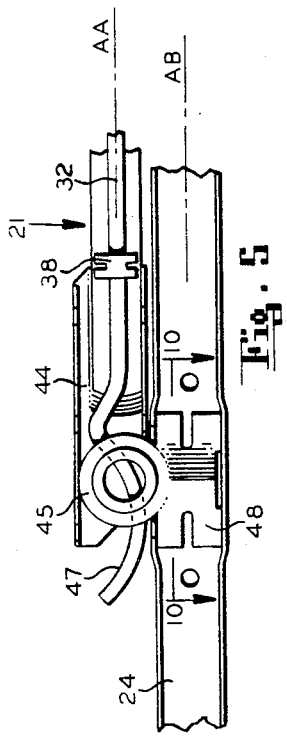
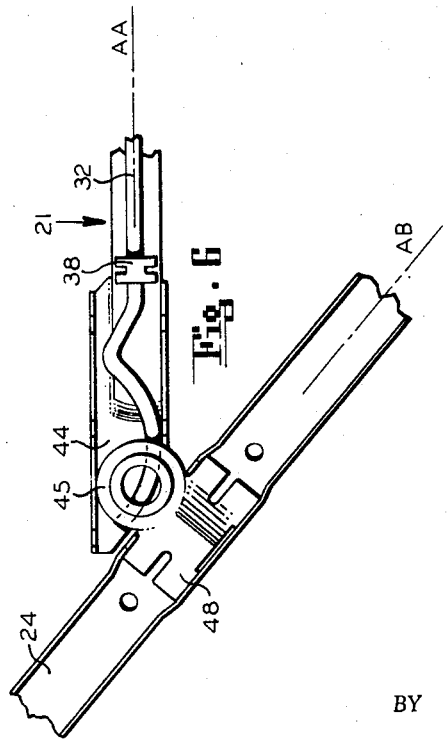
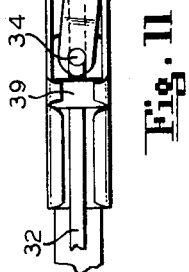
INVENTOR.
LEO J. WUBBE
BY
ATTORNEYS July 23, 1968  L. J. WUBBE  3,393,420
WINDSHIELD WIPER APPARATUS
Filed May 10, 1966  3 Sheets-Sheet 3
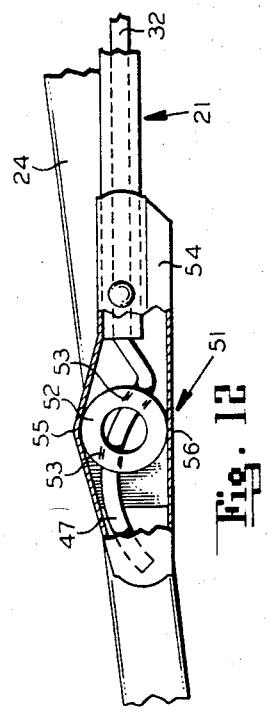
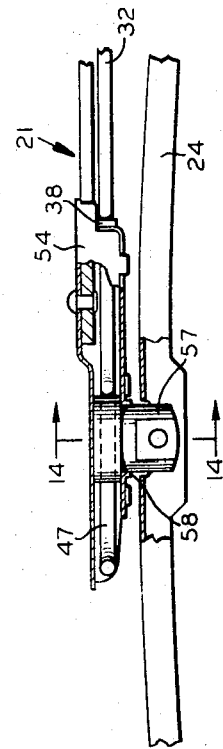
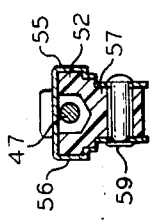
INVENTOR.
LEO J. WUBBE
ATTORNEYS United States Patent Office 3,393,420
Patented July 23, 1968

3,393,420
WINDSHIELD WIPER APPARATUS
Leo J. Wubbe, Beverly Shores, Ind., assignor to The Anderson Company, a corporation of Indiana
Filed May 10, 1966, Ser. No. 548,977
4 Claims. (Cl. 15—250.23)

This invention relates to apparatus for wiping a windshield and is particularly concerned with structure for controlling the position of the wiper blade relative to the arm.

An object of this invention is to provide structure which during operation of the device will pivot the wiper blade relative to the arm to change the angle between the arm and wiper blade so that the wiper blade can more effectively and efficiently wipe a windshield.

Other objects and advantages of this invention will become apparent upon a study of the specification in conjunction with the accompanying drawings.

In the drawings:

FIGURE 1 is a frontal view of a windshield showing the method of operation of wiper arms and blades which embody my invention;

FIGURE 2 is a side view of an arm and wiper blade of the type shown in FIGURE 1;

FIGURE 3 is a top view of the wiper blade and arm of FIGURE 1;

FIGURE 4 is an enlarged top view of the mid-portion of the wiper blade and the end of the arm of FIGURE 1;

FIGURE 5 is a bottom view of the structure shown in FIGURE 4 with a portion of the housing removed;

FIGURE 6 shows the same structure as FIGURE 5, with the wiper blade in another position relative to the arm;

FIGURE 7 is a sectional view taken along lines 7—7 of FIGURE 3;

FIGURE 8 shows the element or structure connecting the arm and the wiper blade with a cross-section view of the latter taken along lines 8—8 of FIGURE 3 with a portion of the housing removed;

FIGURE 9 is a view similar to that of FIGURE 8, but at a slightly different angle;

FIGURE 10 is a partial cross-sectional view taken along lines 10—10 of FIGURE 5;

FIGURE 11 is an enlarged bottom view of most of the arm shown in FIGURES 2 and 3;

FIGURES 12 and 13 are views of another embodiment of the invention similar to the views of FIGURES 5 and 7, except that FIGURE 12 is a top view and the arm and blade are at a slight angle; and FIGURE 14 is a cross section of the embodiment shown in FIGURE 13, taken along the lines 14—14.

FIGURE 1 of the drawings shows the device of the present invention in use on a windshield 20. Wiper arms, indicated generally by 21, are motor driven and oscillatably move wiper blades, indicated generally by 22, across windshield 20 in spring-urged wiping contact therewith. As wiper blades 22 move across the windshield, they are pivoted with respect to the arms so that, as the arms approach their outboard limits of travel, the wiper blades tend to remain upright and thus more effectively wipe the sides of the windshield (as shown by the full line positions in FIGURE 1). In the inboard or center position the arms and wiper blades pivot so as to lie substantially parallel to each other (as shown by the dotted positions in FIGURE 1) and thus cause minimum obstruction to vision.

As shown in FIGURE 2, wiper blade 22 has a wiping member 23 and an articulated pressure-distributing assembly, such as a triple yoke superstructure having a primary yoke 24 and secondary yokes 25 connected to blade 23, all as are well known to the art. The head portion 26 of arm 21 is pivotally attached to the remainder of the arm and has a splined recess 27 (see FIGURE 11) which is adapted to be received on splined head 28 of driving pivot shaft 29.

In accordance with an embodiment of the present invention, underlying arm 21 is a secondary arm or motion-imparting means indicated generally by 31, comprising an outer reciprocable member or portion, such as rod 32, and an inner articulated member or link 33 pivotally connected to rod 32 by a downturned portion 34 of the rod. A pivot point fixedly secured with respect to cowling 35, such as pin 36, is pivotally connected to hole or aperture 37 at the inner end of link 33. Since the arc of travel of link 33 is off-center with respect to the arc of travel of arm 21, oscillation of the arm will cause a back and forth movement or motion of the outer end of link 33. Such movement causes rod 32, which is slidably carried by bearings 38 and 39 affixed to the outer part of arm 21 (see FIGURES 6 and 7) to have, in turn, a reciprocating linear movement or motion with respect to arm 21. The operation of secondary arm 31 is illustrated in FIGURE 11, where the dotted position of arm 31 represents its relation to arm 21 at the outer limit of travel, the full lines showing its relation at the inner limit of travel.

The blade 22 and arm 21 are connected by a member or element indicated generally by 41 (see particularly FIGURES 8 and 9) which conveniently may be made out of a single piece of plastic of suitable physical properties, such as by injection molding. Member 41 has upper and lower bearings, rings or hubs 42 which are positioned in upper and lower cups or recesses 43 of covering or housing 44. Since housing 44 is permanently affixed to the outer end of arm 21 and since hubs 42 are free to turn in recesses 43, member 41 can pivot or rotate in a plane parallel to the path of travel of the arm and generally parallel to the windshield.

Between hubs 42 is an annulus or ring 45 which is pierced or apertured by diametrically placed holes 46. Member 41 has a flat or blade portion 48 which extends or projects sidewise in integral or fixed connecting relationship to the remainder of member 41 (annulus 45 and hubs 42). As shown in FIGURES 4, 5 and 6, the outermost end 47 of rod 32 is curved or arcuate in shape. Arcuate end 47 is slidably received in holes 46. When rod 32 is reciprocated, the holes 46 in ring 45 slide or follow along the arcuate end 47. Since member 41 is firmly and rotatably held with respect to the arm, member 41 accordingly twists, rotates or pivots with respect to the arm. In other words, arcuate end 47 acts as a guide that apertured ring 45 follows so that reciprocating motion of member 32 is translated into rotary motion of member 41. Since blade portion 48 is permanently affixed to the rotating ring, the wiper blade is caused to rotate or pivot with respect to the arm. This operation can be understood by comparing FIGURES 5 and 6. In FIGURE 5, which illustrates the relative positions of the arm and wiper blade at the inner limit of travel (dotted position in FIGURE 1), axis AA of the arm is parallel to the axis AB of the blade. In FIGURE 6, which illustrates the position of the outer limit of travel (full line position in FIGURE 1), the longitudinal axis AA of the arm is inclined at a considerable angle to the longitudinal axis AB of the blade.

As shown in FIGURE 10, member 48 is positioned within an enclosure formed by the top portion of primary yoke 24 and housing 49. The sides of member 48 are tapered and thus permit limited rocking or pivotal movement of the blade with respect to the arm in a plane generally perpendicular to the surface of the windshield.

In the embodiment of the invention shown in FIG-

URES 12, 13 and 14, in which the arm is in superimposed relationship to the blade rather than the side-by-side relationship shown in the previously described embodiment, parts or structures that are similar or identical to those in the previously described embodiment have been given identical numbers. At the top of member 51, which serves the same purpose and function as member 41 in the previously described embodiment, is a ring or annulus 52 which has diametrically opposed openings or apertures 53 which slidably receive the arcuate end 47 of reciprocating member 32. Ring 52 is positioned in the upper part or top of the covering or housing 54 at the end of arm 21. The top of housing 54 is shaped so that sides 55 and 56 surround ring 52 and maintain it in position, but permit its free rotation. Below ring 52 is a cylindrical portion or element 57, the upper portion of which is slidably or rotatably received by a cylindrical portion 58 of the bottom of housing 54. The top of yoke 24 is apertured or cut to receive cylindrical portion 57 of member 51, the sides of cylindrical portion 57 being flattened to fit in between the side walls of the yoke. Member 51 is pivotally connected to yoke 25 by pivot 59, as shown FIGURE 14, so that the wiper blade can pivot or rock with respect to arm 21 in a plane substantially perpendicular to the windshield.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. In apparatus for wiping a vehicle windshield comprising a wiper blade and an arm adapted to be power driven and oscillatably move the wiper blade across a windshield in wiping contact therewith, the improvement comprising:
  arcuate guide means positioned proximate the end of the arm and extending generally in the direction of the longitudinal axis of said arm,
  motion-imparting means associated with said arcuate guide means for causing reciprocating movement of said guide means upon oscillation of said arm,
  follower means rotatably connected to said arm so as to be rotatable in a plane generally parallel to the windshield,
  means connected to said follower means for supporting said wiper blade,
  said follower means being movable along said arcuate guide means whereby said reciprocating movement of said arcuate guide means causes said wiper blade to rotate and change the angular relation between the longitudinal axes of the wiper blade and the arm.
2. The improvement of claim 1 in which the blade and arm are in part generally in side-by-side relation.
3. The improvement of claim 1 in which the end of the arm is in superimposed relation to the blade.
4. In apparatus for wiping a vehicle windshield comprising a wiper blade and an arm adapted to be connected to a pivot shaft which is motor driven and oscillatably moves the arm and wiper blade across a windshield, the improvement comprising:
  a rod slidably carried by the outer end of said arm, said rod having an arcuately shaped outer portion,
  a link pivotally connected at its outer end to the inner end of said rod and adapted to be pivotally connected at its inner end to a fixed point adjacent but spaced from said pivot shaft,
  an annular ring having diametrically placed holes adapted to slidably receive the arcuate portion of said rod,
  means rotatably connecting said annular ring to the end of said arm for rotation in a plane generally parallel to the windshield,
  means fixedly connected to said annular ring and rockably connected to said wiper blade,
  whereby oscillation of the arm causes said rod to move in the direction of the longitudinal axis of the arm and said annular ring to twist as it moves along said arcuate portion of said rod and change the angular relation between the longitudinal axes of said wiper blade and said arm.

References Cited

UNITED STATES PATENTS

| | | | |
|---|---|---|---|
| 1,660,971 | 2/1928 | Lindner | 15—250.23 |
| 2,356,424 | 8/1944 | Paton | 15—250.23 |
| 2,550,094 | 4/1951 | Smulski | 15—250.23 |
| 2,552,822 | 5/1951 | Smulski | 15—250.23 |
| 2,787,018 | 4/1957 | Smith | 15—250.23 |
| 2,790,195 | 4/1957 | Wrobel | 15—250.23 |
| 2,811,736 | 11/1957 | Kurkechian | 15—250.23 |
| 3,067,448 | 12/1962 | Belsky | 15—250.23 |
| 3,077,628 | 2/1963 | Lystad | 15—250.23 |
| 3,128,490 | 4/1964 | Alfieri | 15—250.23 |
| 3,247,540 | 4/1966 | Howard et al. | 15—250.23 |

CHARLES A. WILLMUTH, *Primary Examiner.*

R. I. SMITH, *Assistant Examiner.*